United States Patent
Yan

(10) Patent No.: US 7,858,916 B2
(45) Date of Patent: *Dec. 28, 2010

(54) METHOD AND APPARATUS EMPLOYING DYNAMIC ELEMENT MATCHING FOR REDUCTION OF COLUMN-WISE FIXED PATTERN NOISE IN A SOLID STATE IMAGING SENSOR

(75) Inventor: Hai Yan, Fontana, CA (US)

(73) Assignee: Aptina Imaging Corporation, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/474,894

(22) Filed: May 29, 2009

(65) Prior Publication Data

US 2009/0242738 A1    Oct. 1, 2009

Related U.S. Application Data

(63) Continuation of application No. 11/104,434, filed on Apr. 13, 2005, now Pat. No. 7,554,066.

(51) Int. Cl.
*H01L 27/00* (2006.01)
*H04N 5/217* (2006.01)

(52) U.S. Cl. .................................. 250/208.1; 348/241

(58) Field of Classification Search .............. 250/208.1, 250/214.1, 214 R; 348/241, 302, 319–322
See application file for complete search history.

(56) References Cited

U.S. PATENT DOCUMENTS

| | | | |
|---|---|---|---|
| 5,790,191 A | 8/1998 | Zhang | |
| 5,965,871 A * | 10/1999 | Zhou et al. | 250/208.1 |
| 6,787,752 B2 | 9/2004 | Tsai | |
| 2002/0044211 A1 | 4/2002 | Tujii et al. | |
| 2002/0100862 A1 | 8/2002 | Liu | |
| 2002/0154347 A1 | 10/2002 | Funakoshi et al. | |
| 2003/0107663 A1 | 6/2003 | Cheng et al. | |
| 2003/0133625 A1 | 7/2003 | Pain et al. | |
| 2004/0041931 A1 | 3/2004 | Tu et al. | |
| 2004/0135910 A1* | 7/2004 | Nam | 348/308 |
| 2004/0159771 A1 | 8/2004 | Yang et al. | |
| 2005/0062866 A1* | 3/2005 | Ang | 348/302 |
| 2006/0125940 A1 | 6/2006 | Tinkler et al. | |

FOREIGN PATENT DOCUMENTS

EP    1 115 244 A3    7/2001

OTHER PUBLICATIONS

European Examination Report (Sep. 25, 2009).
Analog Integrated Circuit Design by David Johns, Ken Martin, John Wiley & Sons; New York 1997 pp. 471-475, 507-509 and 565-576.
Korean Office Action, Jan. 19, 2009.
Taiwan Office Action with Search Report, May 15, 2009, 69 pages (with translation).

* cited by examiner

*Primary Examiner*—Thanh X Luu

(57) ABSTRACT

An imager having a switching circuit that couples pixel columns to different sample and hold circuits to reduce the noticeability of column-wise fixed pattern noise. A controller randomly couples a pixel column to a sample and hold circuit, therefore fixed pattern noise emanating from a particular sample and hold circuit is not always associated with a single pixel column. Therefore the visual perception of fixed pattern noise associated with a particular sample and hold circuit is reduced.

27 Claims, 4 Drawing Sheets

US 7,858,916 B2

METHOD AND APPARATUS EMPLOYING DYNAMIC ELEMENT MATCHING FOR REDUCTION OF COLUMN-WISE FIXED PATTERN NOISE IN A SOLID STATE IMAGING SENSOR

This application is a continuation of application Ser. No. 11/104,434, filed on Apr. 13, 2005, now U.S. Pat. No. 7,554,066 which is hereby incorporated by reference in its entirety.

FIELD OF THE INVENTION

The invention relates generally to semiconductor imaging devices, and more particularly to reducing the noticeability of fixed pattern noise in a solid state imager.

BACKGROUND OF THE INVENTION

There is a current interest in CMOS active pixel imagers for use as low cost imaging devices. Active pixel sensors can have one or more active transistors within the pixel unit cell, can be made compatible with CMOS technologies, and promise higher readout rates compared to passive pixel sensors.

FIG. 1 shows a conventional imager 200 that includes an array of pixels 230 and a timing and control circuit or controller 232 which provides timing and control signals to control the reading out of signals stored in the pixels in a manner commonly known to those skilled in the art. Exemplary arrays have dimensions of M times N pixels, with the size of the array 230 depending on the particular application. The imager is read out a row at a time using a column parallel readout architecture. The controller 232 selects a particular row of pixels in the array 230 by controlling the operation of row addressing circuit 234 and row drivers 240. Charge signals stored in the selected row of pixels are provided on column lines 170 (FIG. 2) to a readout circuit 242 as conventionally known. Referring back to FIG. 1, the pixel signal read from each of the columns can then be read out sequentially using a column addressing circuit 244. Differential pixel signals corresponding to the read out reset signal (Vrst) and integrated charge signal (Vsig) are provided as respective outputs Vout1, Vout2 of the readout circuit 242.

FIG. 2 more clearly shows the rows and columns 349 of pixel array 230 and the associated readout circuit 242. Each column 349 includes multiple rows of pixels 350. The readout circuit 242 includes sample and hold circuitry 351 for storing the pixel reset (Vrst) and integrated charge signals (Vsig). Signals from the pixels 350 in a particular column 349 can be read out through a column line 170 to the sample and hold circuit 351 associated with that column. Typically, Vrst is stored in capacitor c_rst and Vsig is stored in capacitor c_sig in the sample and hold circuit 351. The gain of the sample and hold circuit 351 is a function of a biasing current Iln connected to the column line 170.

Signals stored in the readout circuit 242 can be read out sequentially column-by-column to an output stage 354, which is common to the entire array of pixels 330. Output stage 359 provides two output signals Vout1, Vout2 that correspond to the Vsig, Vrst signals, respectively. The analog output signals Vout1, Vout2 can then be sent, for example, to a differential analog circuit, which subtracts the reset and integrated charge signals and sends the subtracted signal to an analog-to-digital converter (ADC); alternatively, the reset and integrated charge signals can be supplied directly to the analog-to-digital converter.

During manufacture, each imaging pixel array is usually tested individually. Tests detect defective pixel circuits, pixel signal level, and other array attributes, and the information is stored based on lot and individual device identification numbers. The information developed during testing can be utilized to enhance the operation of the device by, for example, compensating for defective pixels, differing pixel signal levels, and other tested pixel attributes.

Because variances occur during manufacturing, the capacitance values of capacitors c_rst and c_sig will be different, ideally only slightly different. However, it is not easy or cheap to test the capacitance value of each capacitor c_rst, c_sig and then modify the capacitors to have the same capacitance value. Thus, capacitors c_rst and c_sig of each sample and hold circuit 351 will add a different amount of column-wise fixed pattern noise to the readout process.

Similarly, the bias current Iln will vary from column to column. Although the difference may not be large, nonetheless, the different Iln current values will add different amounts of gain during read out of each sample and hold circuit 351. Thus, the bias current Iln of each sample and hold circuit 351 will add a different amount of column-wise fixed pattern noise to the relevant process.

The human eye is sensitive to column-wise noise, which may manifest as a column in an image being different from surrounding columns of the image. Therefore, it is desirable to modify the imager to reduce the visual obviousness of column-wise fixed pattern noise

BRIEF SUMMARY OF THE INVENTION

An imager is provided in an exemplary embodiment that reduces the visual obviousness of column-wise fixed pattern noise by randomly mixing and applying fixed pattern noise to different columns in the imager's array. In an exemplary embodiment of the invention, signals from the columns of the pixel array are read out to varying sample and hold circuits selected at random. In addition, pixel columns are randomly matched to sample and hold circuits.

BRIEF DESCRIPTION OF THE DRAWINGS

These and other features and advantages of the invention will be more readily understood from the following detailed description of the invention which is provided in connection with the accompanying drawings, in which.

DETAILED DESCRIPTION OF THE INVENTION

In the following detailed description, reference is made to the accompanying drawings, which form a part hereof, and in which is shown by way of illustration specific exemplary embodiments of the invention. These embodiments are described in sufficient detail to enable those of ordinary skill in the art to make and use the invention, and it is to be understood that structural, logical or other changes may be made to the specific embodiments disclosed without departing from the spirit and scope of the present invention.

Figure 1:
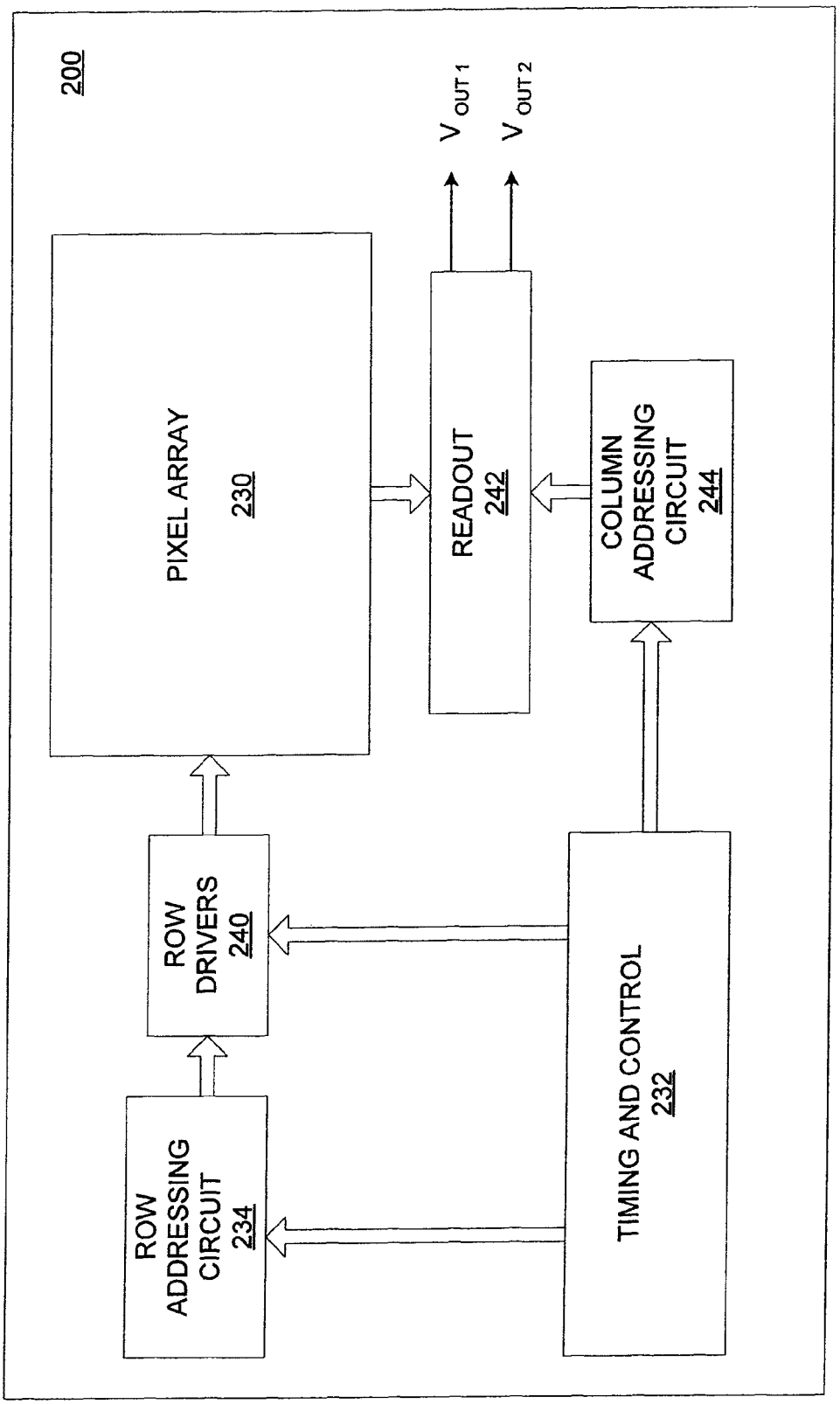
FIG. 1 is a block diagram of a conventional digital system having an active pixel sensor array and associated processing circuitry.
Figure 2:
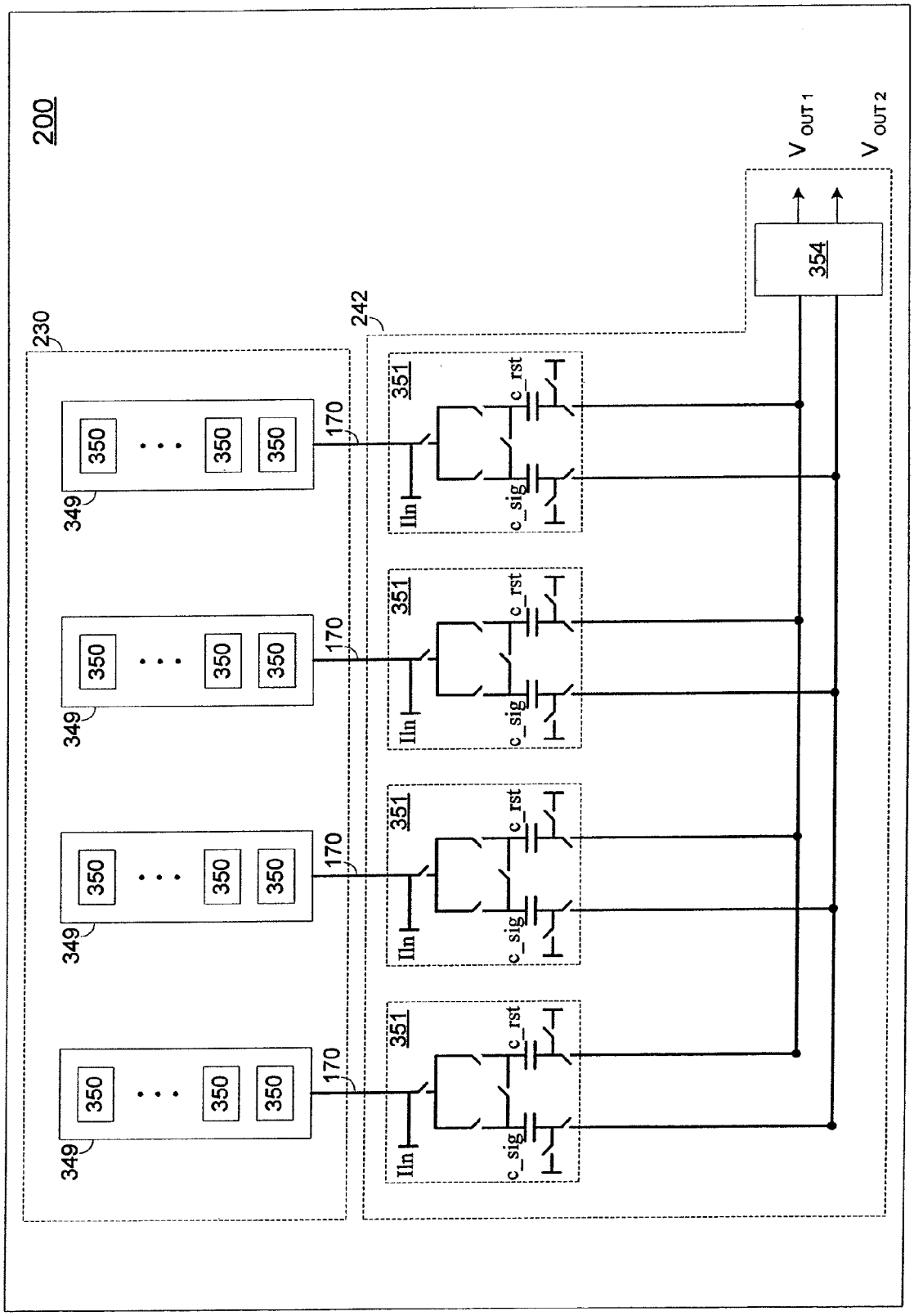
FIG. 2 is a block diagram showing a portion of the sensor of FIG. 1 in greater detail.
Figure 3:
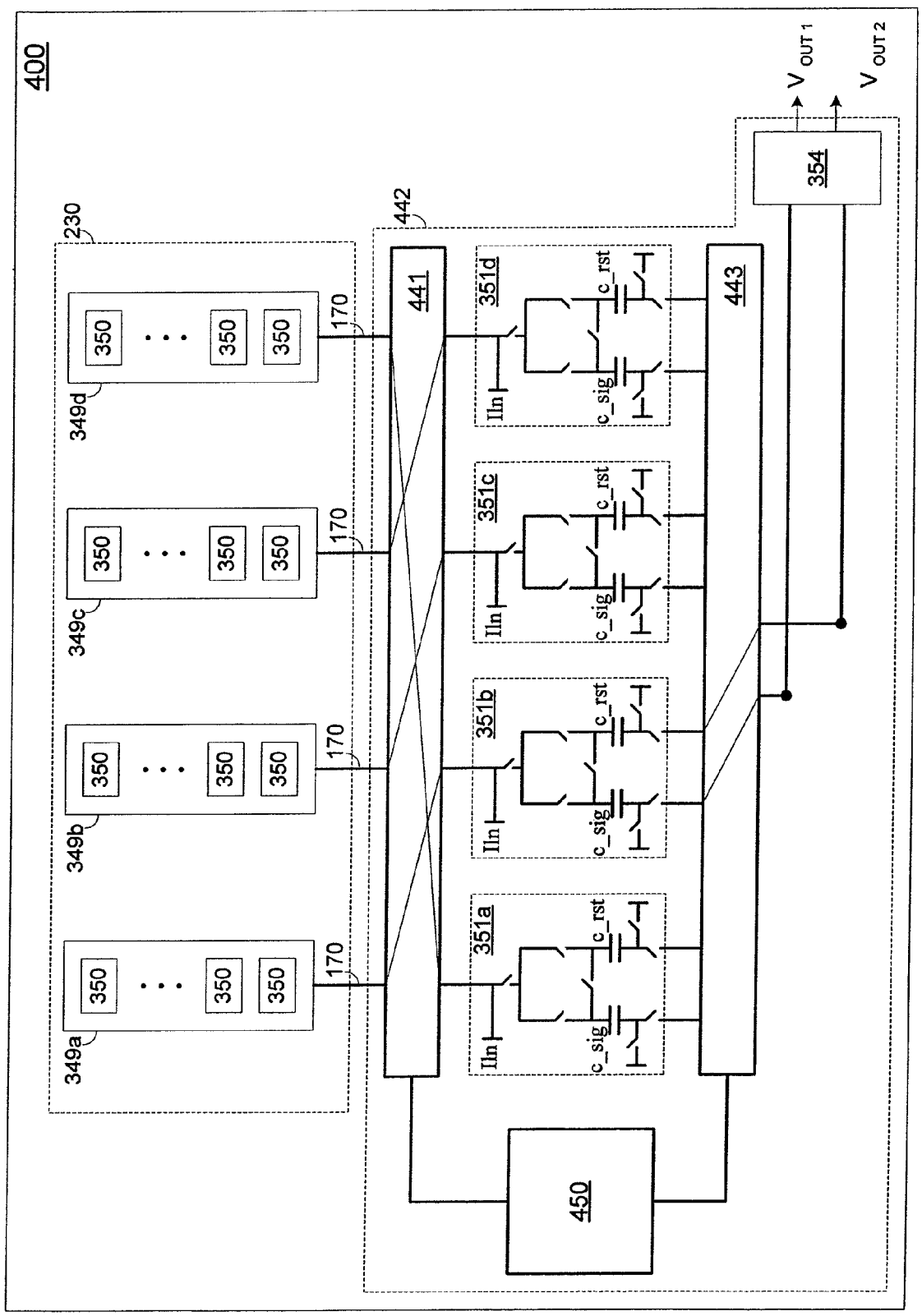
FIG. 3 is a block diagram of a digital system having an active pixel sensor array and associated processing circuitry in accordance with an exemplary embodiment of the invention.

FIG. 3 depicts a signal processing system 400, which includes an active pixel sensor ("APS") array 230 and a readout circuit 442 constructed in accordance with an exemplary embodiment of the invention. The signal processing system 400 differs from the system 200 illustrated in FIGS. 1 and 2 in several respects, which are described in greater detail below.

The illustrated system 400 includes pixel array 230 connected to the readout circuit 442. Readout circuit 442 includes a first switching circuit 441, second switching circuit 443, and a controller 450 for controlling the switching circuits 441, 443. The readout circuit 442 is different from the conventional readout circuit 242 (FIG. 2) in that sample and hold circuits 351*a-d* of readout circuit 442 are not always associated with the same pixel column 349*a-d* (explained in more detail below).

Each pixel column 349*a-d* is coupled to the first switching circuit 441. The switch setting of the first switching circuit 441 determines which pixel column 349*a-d* is selectively coupled to which sample and hold circuit 351*a-d*. For example, FIG. 3 depicts: the first pixel column 349*a* coupled through the first switching circuit 441 to the second sample and hold circuit 351*b*; the second pixel column 349*b* coupled through the first switching circuit 441 to the third sample and hold circuit 351*c*; the third pixel column 349*c* coupled through the first switching circuit 441 to the fourth sample and hold circuit 351*d*; and the fourth pixel column 349*d* coupled through the first switching circuit 441 to the first sample and hold circuit 351*a*. In an exemplary embodiment, the first switching circuit 441 enables each pixel column 349*a-d* to be substantially simultaneously coupled to an associated selected sample and hold circuit 351*a-d*. In another aspect, only a single pixel column is coupled to its associated selected sample and hold circuit at a time.

The controller 450 provides signals to the first switching circuit 441 indicating which pixel column 349*a-d* is to be coupled to which sample and hold circuit 351*a-d*. In a preferred embodiment, the controller's 450 matching of pixel columns 349*a-d* and sample and hold circuits 351*a-d* is done on a random basis. Although described with respect to a random assignment, the invention is not so limited. For example, the matching may occur in pseudo-random, or any other varying matching fashion.

In an exemplary embodiment, the controller 450 re-matches, i.e., generates new matches between, pixel columns 349*a-d* and sample and hold circuits 351*a-d* before each read out from a row in the pixel array 230. For example, the controller 450 determines a match and then the selected row is readout, then the controller 450 determines a match and the next row is readout. In another aspect, the controller 450 re-matches periodically; that is to say that the time interval between the controller establishing another set of matches is a set time interval. The controller 450 establishes the time interval before reading out from the image array. For example, if the time interval is five, then the controller 450 rematches before each fifth read out from a row in the pixel array 230. In yet another aspect, the controller 450 re-matches at various time intervals, where the time intervals are generated on a varying fashion, ideally in a random fashion. For example, if the time interval to re-match is random, then the controller 450 re-matches before the first, fifth, and thirteenth read outs from rows in the pixel array 230. Although this invention is described with reference to a conventional readout from an array (e.g., sequentially reading a row from the first column on the left to the last column on the right and then repeating for the next row), the invention is not so limited. For example, the imager may be readout in an interleaved fashion. Additionally, there are times when not all of the rows or columns are read out, e.g., when varying the resolution of the imager.

The output of each sample and hold circuit 351*a-d* is coupled to the second switching circuit 443. The selection of the second switching circuit 443 determines which sample and hold circuit 351*a-d* is coupled to the output stage 354. The controller 450 provides signals to the second switching circuit 443 indicating which sample and hold circuit 351*a-d* is to be coupled to the output stage 354. The controller 450 provides a signal to the second switching circuit 443 before the read out of a sample and hold circuit 351*a-d*.

In a preferred embodiment, the controller's 450 matching of sample and hold circuits 351*a-d* to output stage 354 is performed based on the current matching of pixel columns 349*a-d* to sample and hold circuits 351*a-d* by the controller 450. For example, in conventional systems where a row is read out sequentially, left to right, and the controller matched the first pixel column 349*a* with the second sample and hold circuit 351*b*, the second pixel column 349*b* with the third sample and hold circuit 351*c*, the third pixel column 349*c* with the fourth sample and hold circuit 351*d*, and the fourth pixel column 349*d* with the first sample and hold circuit 351*a*, then the first sample and hold circuit to be readout to the output stage 354, is the second sample and hold circuit 351*b*. Therefore, the controller 450 provides an appropriate signal to the second switching circuit 443 to couple the second sample and hold circuit 351*b* to the output stage 354. For the next read out, the controller 450 provides an appropriate signal to the second switching circuit 443, to couple the third sample and hold circuit 351*c* to the output stage 354. For the next read out, the controller 450 provides an appropriate signal to the second switching circuit 443 to couple the fourth sample and hold circuit 351*d* to the output stage 354. For the next read out, the controller 450 provides an appropriate signal to the second switching circuit 443 to couple the first sample and hold circuit 351*a* to the output stage 354. In an alternative embodiment, the controller 450 provides a signal to a separate processing circuit (not shown) indicating the match for each row and the sample and hold circuits 351*a-d* will be read out sequentially left to right (i.e. circuits 351*a* to 351*d*). The separate processing circuit coordinates re-ordering the signals from each column such that they are representative of the order in which they originate in the image array. In this aspect of the invention, a second switching circuit 442 is not required as the sample and hold circuits 351*a-d* are coupled directly to the output stage 354.

Signals stored in the readout circuits 442 can then be read sequentially column-by-column to the output stage 354, which is common to the entire array of pixels 230. The analog output signals can then be sent, for example, to a differential analog circuit, which subtracts the reset and integrated charge signals and sends the subtracted signal to an analog-to-digital converter (ADC); alternatively, the reset and integrated charge signals can be supplied directly to the analog-to-digital converter.

Therefore, an imager is provided that reduces the visual obviousness of column-wise fixed pattern noise by randomly mixing and applying fixed pattern noise to different columns of the array. Fixed pattern noise is not necessarily reduced, however, fixed pattern noise from a sample and hold circuit is not always associated with a single pixel column but is instead associated with different pixels. As the noise is applied to different columns, the human eye is less likely to notice the noise.

Figure 4:
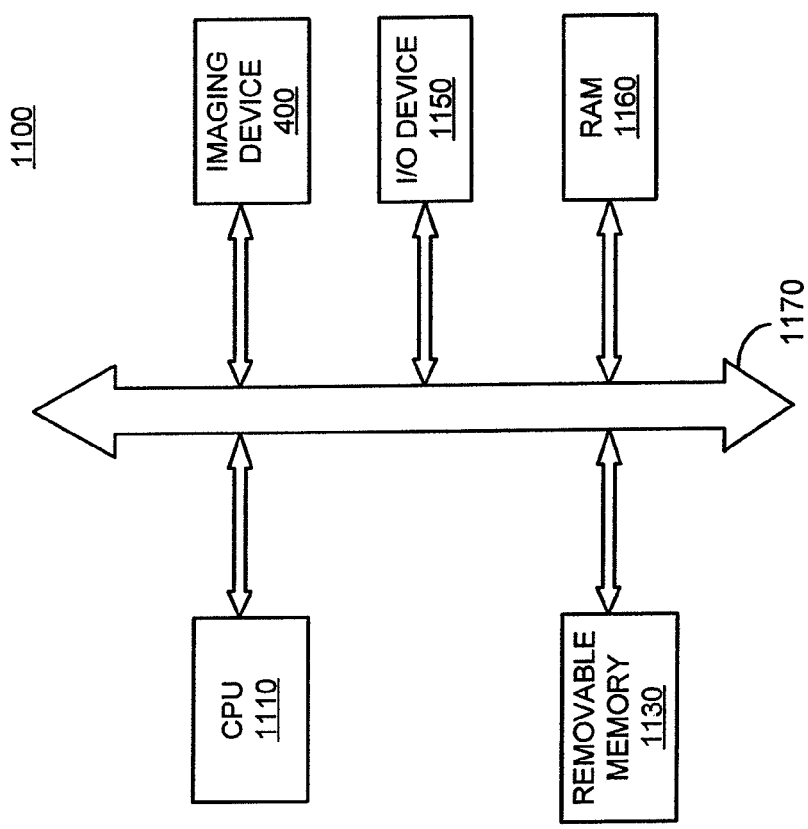
FIG. 4 is a block diagram showing a processor system incorporating at least one imaging device constructed in accordance with an embodiment of the invention.

FIG. 4 shows system 1100, a typical processor system modified to include an APS System 400 containing the readout system, as exemplified by FIG. 3. The system 1100 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and others.

System 1100, for example a camera system, generally comprises a central processing unit (CPU) 1110, such as a microprocessor, that communicates with an input/output (I/O) device 1150 over a bus 1170. Imaging device 400 also communicates with the CPU 1110 over the bus 1170. The system 1100 also includes random access memory (RAM) 1160, and can include removable memory 1130, such as flash memory, which also communicate with the CPU 1110 over the bus 1170. The imaging device 400 may be combined with a processor, such as a CPU, digital signal processor, or microprocessor, with or without memory storage on a single integrated circuit or on a different chip than the processor.

It should be appreciated that other embodiments of the invention include a method of manufacturing the circuit 1100. For example, in one exemplary embodiment, a method of manufacturing an CMOS readout circuit includes the steps of providing, over a portion of a substrate corresponding to a single integrated circuit, at least a pixel array and readout circuit of FIGS. 3 an 4 as described above using known semiconductor fabrication techniques. The method of manufacturing the readout circuit includes forming a plurality of sample and hold circuits over said substrate; and forming a switching circuit over said substrate for switchingly coupling one of said plurality of columns of pixels in said pixel array to one of said sample and hold circuits. The method of manufacturing may further include forming a control circuit over said substrate; and forming an electrical pathway for coupling said control circuit to said switching circuit. Additionally, the method of manufacturing may include the step of forming a second switching circuit over said substrate for switchingly coupling one of said sample and hold circuits to said downstream circuit.

While the invention has been described and illustrated with reference to specific exemplary embodiments, it should be understood that many modifications and substitutions can be made without departing from the spirit and scope of the invention. For example, although the invention is shown with respect to two switching circuits and the associated controller the invention is not meant to be so limiting. The controller functionality can be incorporated into the a controlling circuit already included in conventional system. Accordingly, the invention is not to be considered as limited by the foregoing description but is only limited by the scope of the claims.

What is claimed as new and desired to be protected by Letters Patent of the United States is:

1. A readout circuit for an imaging device comprising a pixel array having a plurality of columns of pixels, said readout circuit comprising:
   a plurality of sample and hold circuits;
   a switching circuit for selectively switching, during readout of an image from said pixel array, each of said pixel columns of said pixel array to one of said plurality of sample-and-hold circuits such that each of said columns of pixels is connected to one of said sample and hold circuits during readout of a row of pixels, said switching circuit performing said selectively switching in a varying fashion during readout of said image from said pixel array such that during said image readout a column of pixels is connected to different sample and hold circuits to reduce the perception of column-wise fixed pattern noise in said image, and
   a controller for generating a plurality of different matches between one of said columns of said pixel array and one of said sample and hold circuits during said image readout and providing a first control signal to said switching circuit indicating said matches, said first control signal indicating which of said columns is to be coupled to which one of said sample and hold circuits,
   wherein said controller generates such matches such that an interval between matching is a periodic interval, and
   wherein said controller generates a match such that matching is done randomly.

2. A readout circuit for an imaging device comprising a pixel array having a plurality of columns of pixels, said readout circuit comprising:
   a plurality of sample and hold circuits;
   a switching circuit for selectively switching, during readout of an image from said pixel array, each of said pixel columns of said pixel array to one of said plurality of sample-and-hold circuits such that each of said columns of pixels is connected to one of said sample and hold circuits during readout of a row of pixels, said switching circuit performing said selectively switching in a varying fashion during readout of said image from said pixel array such that during said image readout a column of pixels is connected to different sample and hold circuits to reduce the perception of column-wise fixed pattern noise in said image; and
   a controller for generating a plurality of different matches between one of said columns of said pixel array and one of said sample and hold circuits during said image readout and providing a first control signal to said switching circuit indicating said matches, said first control signal indicating which of said columns is to be coupled to which one of said sample and hold circuits;
   wherein said controller generates such matches such that an interval between matching is a periodic interval; and
   wherein said controller generates a match such that matching is done pseudo-randomly.

3. A readout circuit as in claim 1 or 2, further comprising a second switching circuit adapted to selectively couple each of said sample-and-hold circuits to a downstream circuit in a selective order.

4. A readout circuit as in claim 3, wherein said controller is adapted to provide a second control signal to said second switching circuit indicating a selective order of coupling said sample and hold circuits to said downstream circuit.

5. A readout circuit as in claim 3, wherein said controller is adapted to provide said second control signal to said second switching circuit such that signals are readout from said sample and hold circuits in an order representative of the location of a pixel column in said array.

6. A readout circuit as in claim 1 or 2 wherein said periodic interval is before each row of the array is readout.

7. A method of reading signals from an imaging device, comprising:
   selectively switching through a switching circuit each column of a pixel array having a plurality of columns to an associated one of a plurality of sample and hold circuits and changing the switching circuit association of said columns and sample and hold circuits during readout of an image from said pixel array, and
   providing a first control signal to said switching circuit, said first control signal indicating which of said columns is matched to be coupled to which of said sample and hold circuits and for changing said matching during said image readout, wherein said matches are changed at a periodic interval during said image readout, and wherein said matching is done randomly.

8. A method of reading signals from an imaging device, comprising:

selectively switching through a switching circuit each column of a pixel array having a plurality of columns to an associated one of a plurality of sample and hold circuits and changing the switching circuit association of said columns and sample and hold circuits during readout of an image from said pixel array, and providing a first control signal to said switching circuit, said first control signal indicating which of said columns is matched to be coupled to which of said sample and hold circuits and for changing said matching during said image readout, wherein said matches are changed at a periodic interval during said image readout, and wherein said matching is done pseudo-randomly.

9. A method as in claim 7 or 8, further comprising the act of selectively coupling in a second switching circuit each of said sample and hold circuits to a downstream circuit.

10. A method as in claim 9, further comprising the act of providing a second control signal to said second switching circuit indicating which of said sample-and hold circuits is selected to be coupled to said downstream circuit.

11. A method as in claim 9, further comprising the act of providing a second control signal to said second switching such that signals are readout from said sample and hold circuits in an order representative of the location of said columns in a row of said pixel array.

12. A method as in claim 7 or 8, further comprising the step of generating new matches before a readout of a row of pixels of an image sensor.

13. An imager device, comprising:

a pixel array having a plurality of columns;

a plurality of sample and hold circuits;

a readout circuit coupled to said pixel array, comprising:

a switching circuit adapted to selectively switch each of said columns of said pixel array to one of said sample and hold circuits, said switching circuit being configured to couple, during a row readout, each of said columns to a respective one of said sample and hold circuits; and a controller for operating said switching circuit such that said switch selection changes which column is coupled to which sample and hold circuit in a varying fashion during readout of an image from said pixel array, said controller providing a first control signal to said switching circuit, said first control signal indicating which of said columns is matched to be coupled to which one of said sample and hold circuits, wherein said controller generates matches such that an interval between matching is a periodic interval, and wherein said controller generates a match such that matching is done randomly.

14. An imager device, comprising:

a pixel array having a plurality of columns;

a plurality of sample and hold circuits;

a readout circuit coupled to said pixel array, comprising:

a switching circuit adapted to selectively switch each of said columns of said pixel array to one of said sample and hold circuits, said switching circuit being configured to couple, during a row readout, each of said columns to a respective one of said sample and hold circuits; and a controller for operating said switching circuit such that said switch selection changes which column is coupled to which sample and hold circuit in a varying fashion during readout of an image from said pixel array, said controller providing a first control signal to said switching circuit, said first control signal indicating which of said columns is matched to be coupled to which one of said sample and hold circuits, wherein said controller generates matches such that an interval between matching is a periodic interval, and wherein said controller generates a match such that matching is done pseudo-randomly.

15. An imager device as in claim 13 or 14, further comprising a second switching circuit adapted to selectively couple each of said sample-and-hold circuits to a downstream circuit.

16. An imager device as in claim 15, wherein said controller is adapted to provide a second control signal to said second switching circuit indicating the order in which said sample and hold circuits are to be coupled to said downstream circuit.

17. An imager device as in claim 15, wherein said controller is adapted to provide said second control signal to said second switching circuit such that signals are readout from said sample and hold circuits in an order representative of the order of columns in a row of said pixel array.

18. An imager device as in claim 13 or 14, wherein said periodic interval is before a row is read out.

19. An imager device comprising:

a pixel array having a plurality of pixels arranged in rows and columns;

a plurality of sample and hold circuits, each of which can be matched with a respective column of pixels during readout of an image from said pixel array;

a first switching circuit for changing the match of a sample and hold circuit with a respective column during readout of said image; and a controller for driving said first switching circuit during image readout to change the match of a sample and hold circuit with a respective column such that during a row-by-row readout of an image from said pixel array a sample and hold circuit is not always associated with the same pixel column of said array, wherein said matching is done in a random fashion.

20. An imager device comprising:

a pixel array having a plurality of pixels arranged in rows and columns;

a plurality of sample and hold circuits, each of which can be matched with a respective column of pixels during readout of an image from said pixel array;

a first switching circuit for changing the match of a sample and hold circuit with a respective column during readout of said image; and a controller for driving said first switching circuit during image readout to change the match of a sample and hold circuit with a respective column such that during a row-by-row readout of an image from said pixel array a sample and hold circuit is not always associated with the same pixel column of said array, wherein said matching is done in a pseudo-random fashion.

21. An imager device as in claim 19 or 20, wherein said controller generates a new match for each row of pixels to be read out.

22. An imager device as in claim 19 or 20, wherein said controller generates a new match periodically during readout of said image.

23. An imager as in claim 19 or 20, wherein said controller establishes a set time interval for generating new matches during image readout.

24. An imager as in claim 19 or 20, wherein said controller establishes a variable time for generating new matches during image readout.

25. An imager device as in claim 19 or 20 further comprising a second switch circuit for selectively coupling each of said sample and hold circuits to a downstream circuit wherein said controller controls operation of said second switch circuit and determines an order in which said sample and hold circuits are coupled to said downstream circuit.

26. An imager device as in claim 25 wherein said columns for each row of said pixel array are read out in an order in a first direction and said controller determines said order to produce outputs of said sample and hold circuits which correspond to the order of said readout.

27. An imager as in claim 19 or 20 further comprising a processing circuit for re-ordering output signals from said sample and hold circuits, said processing circuit performing said re-ordering in accordance with signals from said controller in accordance with matches established by said controller.

* * * * *